(12) United States Patent
Hung (10) Patent No.: US 6,744,642 B2
(45) Date of Patent: Jun. 1, 2004

(54) CIRCUITRY FOR RESETTING MAGNETIC FIELD OF TRANSFORMER

(75) Inventor: Guo-Kiang Hung, Hsin-Chu (TW)

(73) Assignee: Ambit Microsystems Corp., Hsin-Chu (TW)

( * ) Notice: Subject to any disclaimer, the term of this patent is extended or adjusted under 35 U.S.C. 154(b) by 0 days.

(21) Appl. No.: 10/249,746

(22) Filed: May 5, 2003

(65) Prior Publication Data

US 2004/0070997 A1 Apr. 15, 2004

(30) Foreign Application Priority Data

Oct. 14, 2002 (TW) ........................................ 91123620 A (51) Int. Cl.[7] .............................................. H02M 3/335
(52) U.S. Cl. .................................... 363/21.06; 363/56.1
(58) Field of Search ........................... 363/21.06, 21.04, 363/21.08, 56.1, 56.11, 56.12, 97, 131

(56) References Cited

U.S. PATENT DOCUMENTS 4,441,146 A * 4/1984 Vinciarelli ................... 363/20
6,239,989 B1 * 5/2001 Ming-Ching ................. 363/20

* cited by examiner

Primary Examiner—Shawn Riley
(74) Attorney, Agent, or Firm—Winston Hsu (57) ABSTRACT

A transformer reset circuit includes a first capacitor serially connected to a transformer winding, a rectifier connected in parallel with the first capacitor and the transformer winding, a second capacitor, an auxiliary switch connected in series with the second capacitor to form a series circuit connected in parallel with the rectifier, and a switch control circuit. The switch control circuit can turn on the main switch and turn off the auxiliary switch to release magnetizing energy stored in an inductor to charge the first capacitor. The auxiliary switch can be turned on and the main switch can be turned off to transfer the magnetizing energy stored in the inductor and the energy stored in the first capacitor to the second capacitor. After the energy stored in the inductor is dissipated, the second capacitor charges the inductor and the first capacitor to reverse the magnetic field in the inductor so as to reset the transformer.

20 Claims, 8 Drawing Sheets

CIRCUITRY FOR RESETTING MAGNETIC FIELD OF TRANSFORMER

BACKGROUND OF INVENTION

1. Field of the Invention

The present invention relates to a circuit for resetting a magnetic field of a transformer used in a power converter, and more particularly, to a reset circuitry and method for effectively transmitting the magnetizing energy stored in a transformer core of a power converter and extending a switch duty cycle of the power converter.

2. Description of the Prior Art

Figure 1:
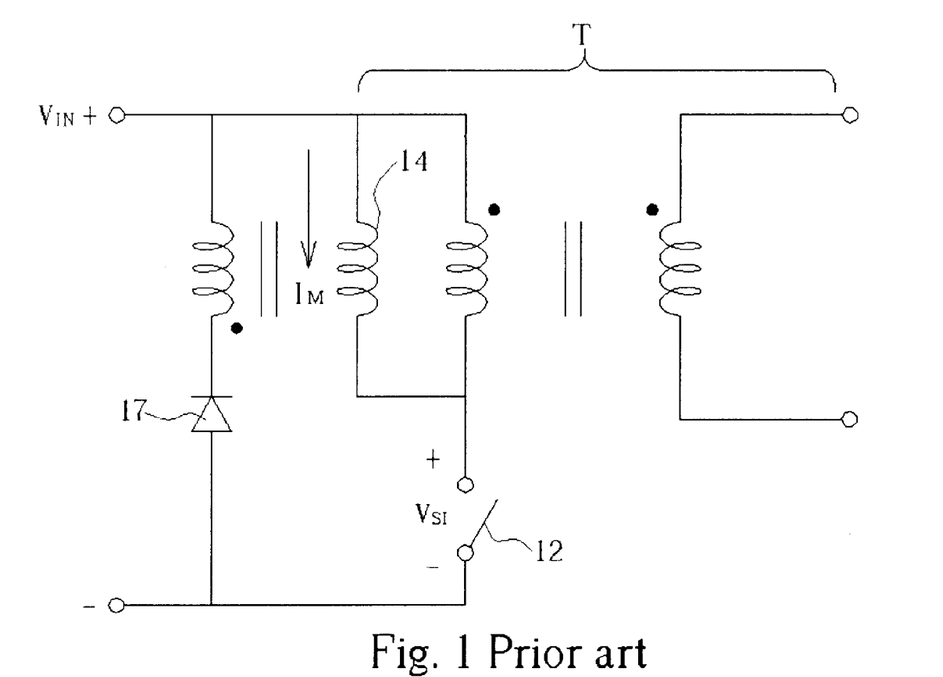
FIG. 1 is a circuit diagram of a tertiary reset circuit according to the prior art.
Figure 2:
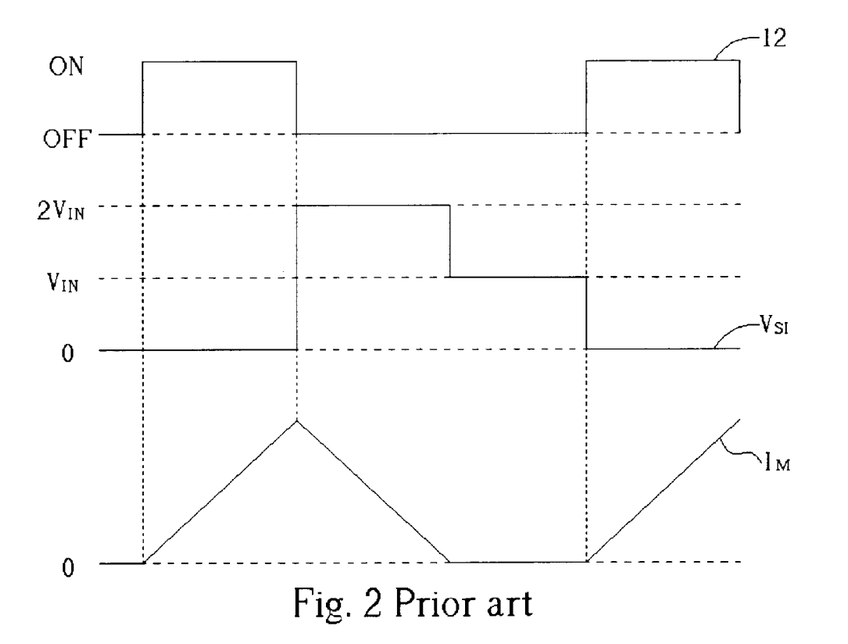
FIG. 2 is a timing diagram of the circuit of FIG. 1.

Three conventional methods for resetting magnetizing energy of a transformer mainly include a tertiary winding reset circuit, an RCD reset circuit, and a resonant reset circuit. Please refer to FIG. 1 and FIG. 2. FIG. 1 is a circuit diagram of a tertiary winding reset circuit according to the prior art. FIG. 2 is a timing diagram of the circuit of FIG. 1. The tertiary winding reset circuit as shown in FIG. 1 includes a diode 17 connected in series with a tertiary winding of a transformer T. The transformer T has a magnetizing inductor 14 and a first switch 12 for controlling a duty cycle of the transformer T. In FIG. 2, a rectangular pulse 12 represents the signal voltage of the first switch 12, $V_{S1}$ represents the voltage across the first switch 12, and $I_M$ represents the current flowing through the magnetizing inductor 14 of the transformer T. When the first switch 12 is turned on, the transformer T charges the magnetizing inductor 14 until the first switch 12 is turned off. At this moment, the diode 17 connected in series with a tertiary winding of the transformer T is turned on and the magnetizing inductor 14 discharges through such loop until the magnetizing energy thereof is fully discharged. The magnetizing inductor 14 will not conduct current until the next ON period of the first switch 12, as can be seen from the current waveform $I_M$ of FIG. 2. If the turn ratio of the primary winding and tertiary winding of the transformer T is 1:1, the charging time and discharging time of the magnetizing inductor 14 will be equal with each other. In other words, the magnetizing energy stored in the magnetizing inductor 14 has to be fully discharged before the first switch 12 is turned on again, and thus the maximum duty cycle of the transformer T is limited within 0.5. Assuming that the duty cycle of the first switch 12 is D=⅓, then $I_M$ only needs one-half of the time necessary to release the magnetizing energy during the OFF period of the first switch 12. When the magnetizing energy is fully discharged, the voltage drop across the primary winding of the transformer T is rated at zero, and the value of $V_{S1}$ decreases from $2V_{IN}$ to $V_{IN}$. According to the above-mentioned, it is known that the most serious drawback of the tertiary winding reset circuit is that the duty cycle of the first switch 12 is limited to a maximum value of 0.5.

Figure 3:
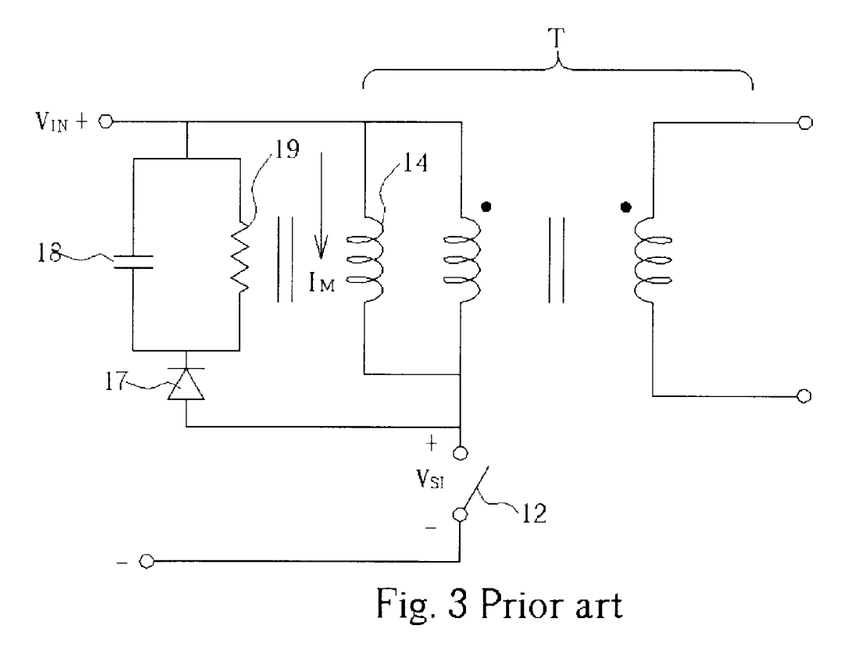
FIG. 3 is a circuit diagram of an RCD reset circuit according to the prior art.
Figure 4:
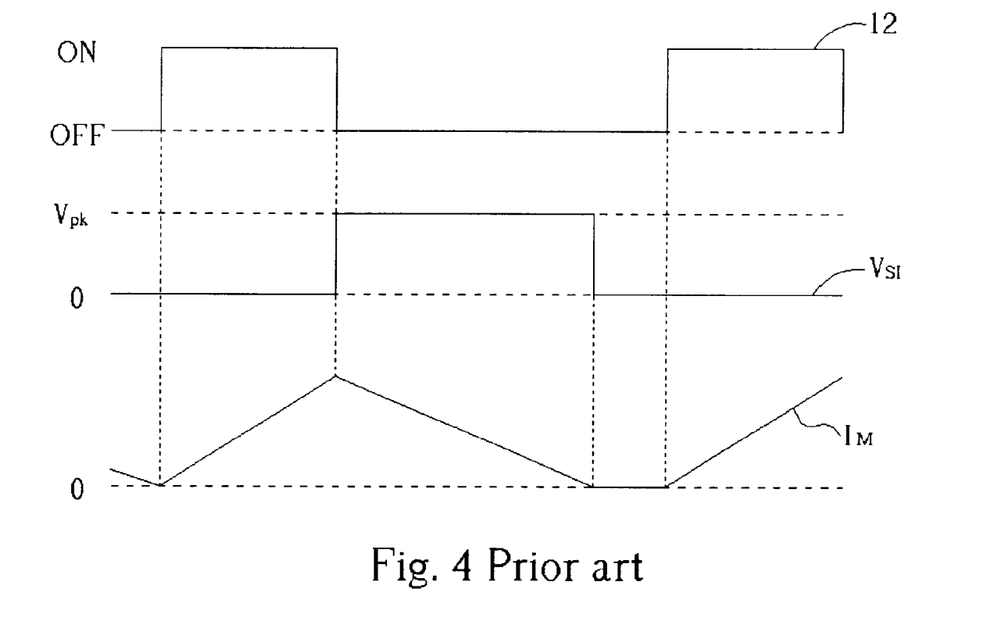
FIG. 4 is a timing diagram of the circuit of FIG. 3.

Please refer to FIG. 3 and FIG. 4. FIG. 3 is a circuit diagram of an RCD reset circuit according to the prior art. FIG. 4 is a timing diagram of the circuit of FIG. 3. For the purpose of giving a clear explanation, like elements have the same reference numerals in the drawings. The RCD reset circuit includes a resistor 19 connected in parallel with a capacitor 18, wherein both of them are then connected in series with a diode 17, and finally connected to a primary winding of the transformer T. When the first switch 12 is turned on, the transformer T charges the magnetizing inductor 14 until the first switch 12 is turned off. At this time, the diode 17 of the RCD reset circuit is turned on, and the magnetizing inductor 14 resets the internal magnetic field of the transformer T via the RCD reset circuit until the next ON period of the first switch 12. Because the parallel resistor 19 is a power-consuming element, when the RCD reset circuit resets the magnetizing energy of the transformer T, the resistor 19 will transform part of magnetizing energy into heat. It can be known from the foregoing that the most serious drawback of the RCD reset circuit is that the resistor 19 dissipates and transduces parts of the magnetizing energy into heat at the same time the inner magnetizing field of the transformer T is reset, and the dissipated energy cannot be retrieved. This reduces the efficiency of the transformer T.

Figure 5:
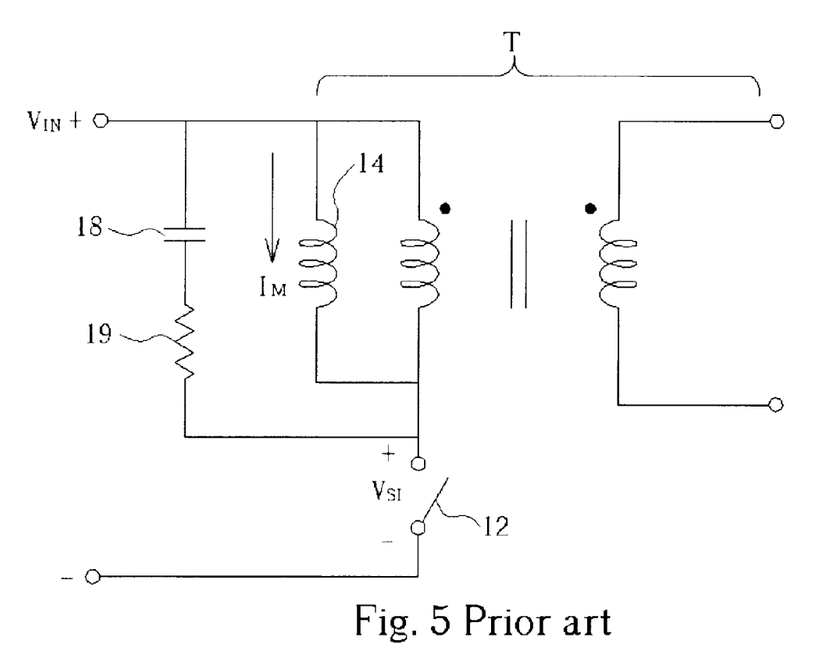
FIG. 5 is a circuit diagram of a resonant reset circuit according to the prior art.
Figure 6:
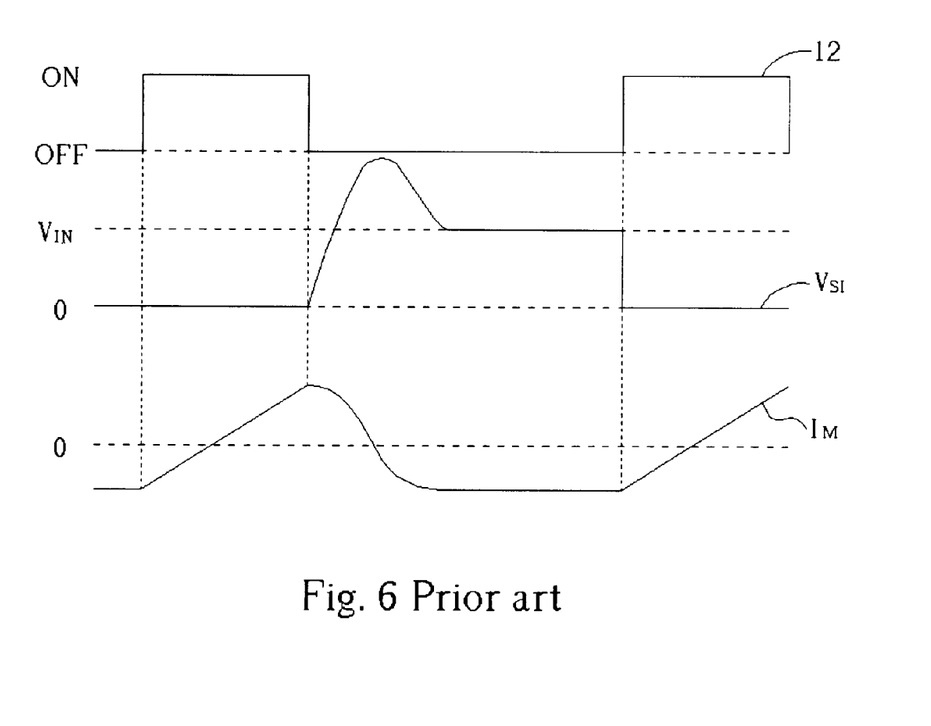
FIG. 6 is a timing diagram of the circuit of FIG. 5.

Please refer to FIG. 5 and FIG. 6. FIG. 5 is a circuit diagram of a resonant reset circuit according to the prior art. FIG. 6 is a timing diagram of the circuit of FIG. 5. The resonant reset circuit includes a capacitor 18 connected in series with the resistor 19, wherein both of them are then connected in parallel with a primary winding of the transformer T. When the first switch 12 is turned on, the transformer T charges the magnetizing inductor 14 until the first switch 12 is turned off. The magnetizing current discharges through a loop comprised of the magnetizing inductor 14, the resistor 19, and the capacitor 18. This loop is referred to as a LC resonant loop. The operating efficiency of the transformer T is enhanced by resetting its internal magnetic via the LC resonant circuit, however the resonance caused by the LC resonant circuit will form a harmonic wave that causes an unexpected high voltage across the first switch 12, as indicated by a voltage $V_{S1}$ shown in FIG. 6. According to the above-mentioned, the most serious drawback of the resonant reset circuit is that the harmonic wave caused by resonance forms an enormous high voltage across the first switch 12, so the transformer T requires a switch having a strong durability and resistivity against a high voltage as the first switch 12.

SUMMARY OF INVENTION

It is therefore a primary objective of the claimed invention to provide a circuitry for resetting a magnetic field in a transformer of a power converter to solve the above-mentioned problems.

According to the claimed invention, there is provided a reset circuitry for resetting an internal magnetic field of a transformer of a power converter when a main switch of the power converter is turned off. The reset circuitry includes a first capacitor connected in series with a winding of the transformer, a rectifier connected in parallel with a series circuit comprising the first capacitor and the winding of the transformer, a second capacitor, an auxiliary switch connected in series with the second capacitor to form a series circuit to be connected in parallel with the rectifier, and a switch control circuit. The switch control circuit is configured to turn on the main switch and turn off the auxiliary switch instantaneously to release the magnetizing energy in a magnetizing inductor of the transformer, and then store the magnetizing energy stored in the magnetizing inductor and charge the first capacitor, and turn on the auxiliary switch and turn off the main switch to transmit the magnetizing energy stored in the magnetizing inductor and the energy stored in the first capacitor to the second capacitor after a short period of time, and charge the magnetizing inductor and the first capacitor by the second capacitor after the magnetizing energy stored in the magnetizing inductor is fully discharged, thereby reset an internal magnetic field of the transformer.

The claimed invention has a general form in which a power converter includes main switch, and a transformer having at least a primary winding and a secondary winding. The primary winding is connected in series with the main switch for receiving a DC voltage and induce an AC voltage on the secondary winding according to an on/off state of the main switch, a switch control circuit, and a reset circuitry for resetting a magnetic field in the transformer. In addition, the transformer has a magnetizing inductor. The switch control circuit can turn on the main switch and turn off the reset circuit in response to a pulse signal generated therefrom to store magnetizing energy in the magnetizing inductor. The switch control circuit can turn on the reset circuit and turn off the main switch in response to another pulse signal generated therefrom to transmit the magnetizing energy in the magnetizing inductor to the reset circuitry after a short period of time.

These and other objectives of the claimed invention will no doubt become obvious to those of ordinary skill in the art after reading the following detailed description of the preferred embodiment that is illustrated in the various figures and drawings.

DETAILED DESCRIPTION

Figure 7:
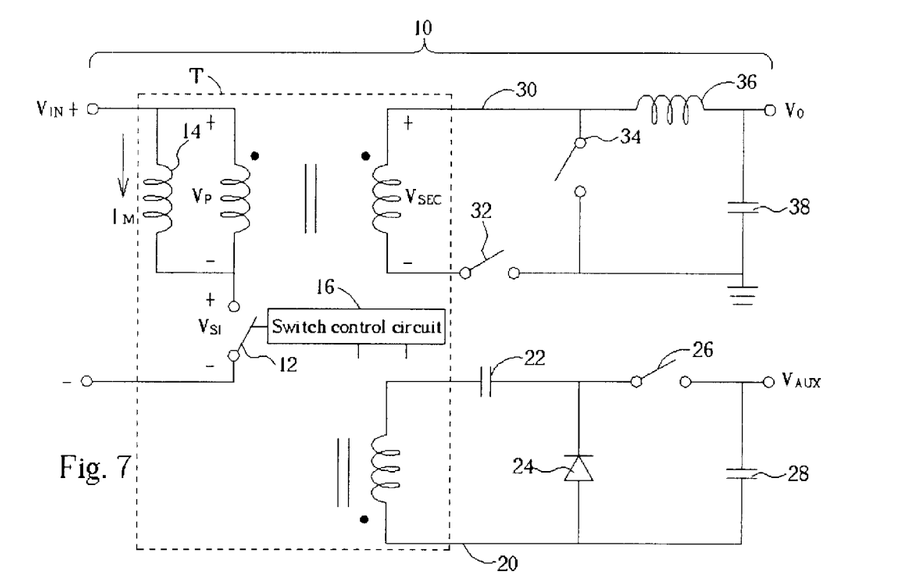
FIG. 7 is a circuit diagram of a reset circuitry for a transformer of a power converter according to the present invention.

The present invention provides a transformer reset circuitry for a power converter. Please refer to FIG. 7. FIG. 7 is a circuit diagram of a reset circuitry 20 connected to an auxiliary winding of a transformer T of a power converter 10 according to the present invention. The transformer T of the power converter 10 includes a magnetizing inductor 14, a primary winding, a secondary winding, and an auxiliary winding. The power converter 10 receives an input DC voltage $V_{IN}$ and induces an AC voltage $V_{SEC}$ on the secondary winding according to the state of a main switch 12. The main switch 12 controls the duty cycle of the transformer T. The reset circuitry 20 includes a first capacitor 22 connected in series with a diode 24 and then connected in parallel with the auxiliary winding of the transformer T as a whole, and an auxiliary switch 26 connected in series with a second capacitor 28 and then connected in parallel with a rectifier such as a diode 24. A switch control circuit 16 is configured to output pulse signals to control the main switch 12 and the auxiliary switch 26 to turn on and off. The main switch 12 and the auxiliary switch 26 are mutually complementary, that is, when the main switch 12 is turned on, the auxiliary switch 26 is turned off; and when the main switch 12 is turned the auxiliary switch 26 is turned on. Additionally, the power converter 10 in FIG. 7 further includes an output circuit 30 connected in parallel with the secondary winding of the transformer T having a first switch 32, a second switch 34, and an output rectifier having an inductor 36 and a capacitor 38 for providing an output voltage Vo for a load (not shown).

During the ON period of the main switch 12, the magnetizing inductor 14 of the transformer T is first discharged and then charged through the main switch 12. The auxiliary switch 26 of the reset circuit 20 is turned off and the diode 24 is turned on subsequently so that the first capacitor 22 is charged through the diode 24. Next, the first switch 32 of the output circuit 30 is turned on and the second switch 32 is turned off. The inductor 36 is charged through the first switch 32 until the main switch 12 is turned off. During the OFF period of the main switch 12, the auxiliary switch 26 of the reset circuit 20 is turned on and the diode 24 is turned off. The energy stored in the first capacitor 22 is discharged to the second capacitor 28 so that astable auxiliary voltage $V_{AUX}$ is developed across the second capacitor 28. The auxiliary voltage $V_{AUX}$ serves a voltage source for the switch control circuit 16 on the condition that a proper turn ratio of the primary winding and the auxiliary winding of the transformer T is selected. At the same time, the magnetizing inductor 14 charges the second capacitor 28 via a loop comprised of the auxiliary winding of the transformer T, the first capacitor 22, the auxiliary switch 26, and the second capacitor 28 until the magnetizing energy in the magnetizing inductor 14 is fully discharged. Next, the second capacitor 28 charges the first capacitor 22 and the magnetizing inductor 14 in an opposite direction via the same loop until the main switch 12 is turned on. During the OFF period of the main switch 12, within the output circuit 30 the first switch 32 is turned off and the second switch 34 is turned on. The inductor 36 discharges to the capacitor 38 for holding the output voltage $V_O$ constant.

The reset circuitry 20 is capable of forming a relatively constant auxiliary voltage $V_{AUX}$ across the second capacitor 28. For example, if the input voltage of the transformer T is $V_{IN}$ and the duty cycle of the transformer T is D, the number of primary windings is $N_1$, the number of secondary windings is $N_2$, the number of auxiliary windings is $N_3$, and the voltage across the second capacitor 28 is $V_{C2}$, then:

$$V_{C2} = V_{IN}(N_2/N_1)$$

$$V_{AUX} = V_{IN}[D/(1-D)](N_3/N_1) + V_{C2}$$

If $V_{IN}$=36V~72V, $N_1:N_2:N_3$=7:1:1, D=0.64~0.32 (ignoring the voltage across the diode 24), the results are as follows:

TABLE 1

| $V_{IN}$ | 36 V | 72 V | 46.2 V |
|---|---|---|---|
| D | 0.64 | 0.32 | 0.5 |
| $V_{ca}$ | 5.1 V | 10.3 V | 6.6 V |
| $V_{AUX}$ | 14.2 V | 15.1 V | 13.2 V |

The variation of the auxiliary voltage $V_{AUX}$ is a $\Delta V_{AUX,MAX}/V_{AUX,MIN}$=14.4%. Compared with the variation of input voltage $V_{IN}$ of $\Delta V_{IN,MAX}/V_{IN,MIN}$=100%, the variation of the auxiliary voltage $V_{AUX}$ is much more stable.

Figure 8:
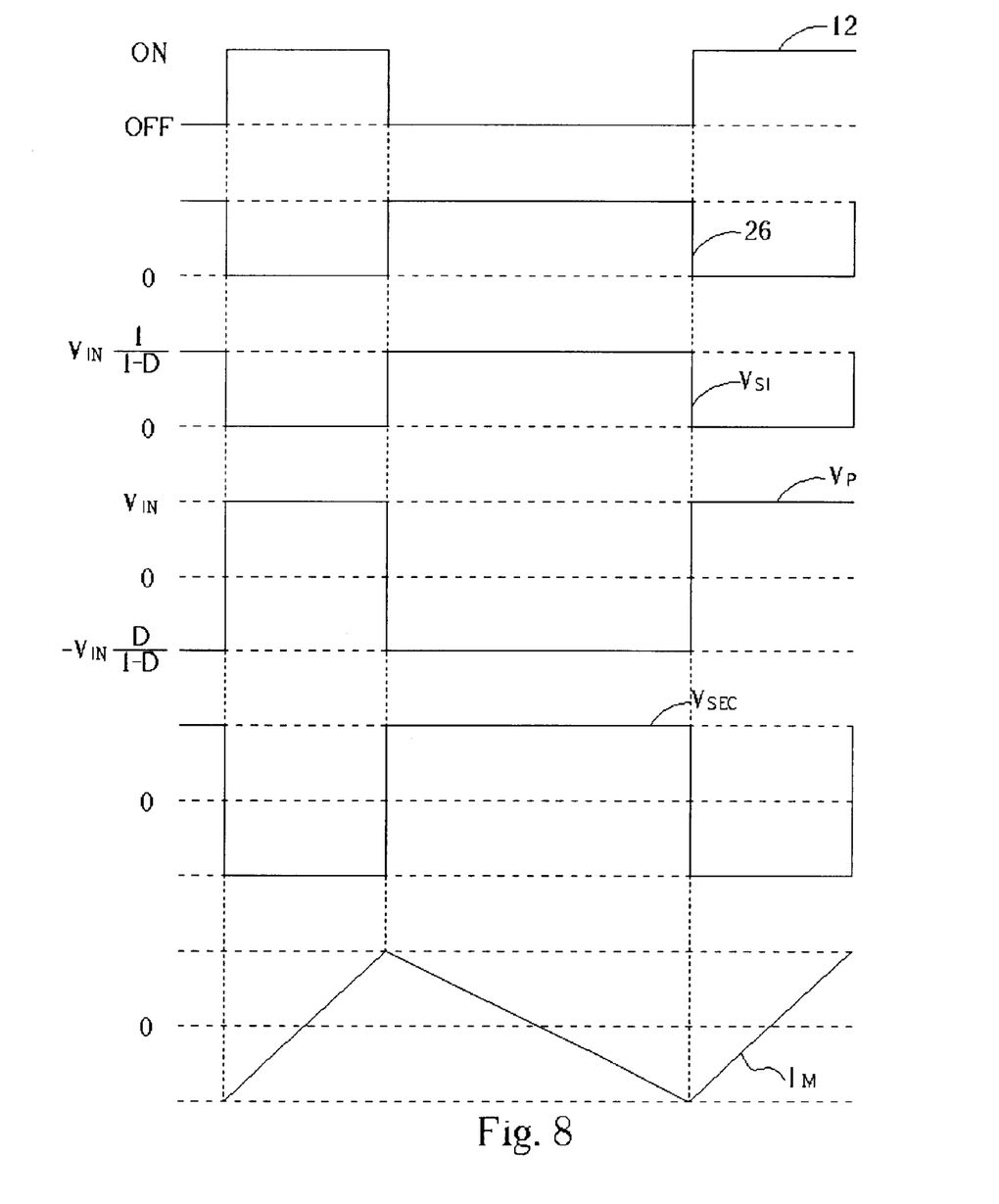
FIG. 8 is a timing diagram of the circuit of FIG. 7.

Please refer to FIG. 8. FIG. 8 is a timing diagram of the circuit of FIG. 7. Reference numeral 12 indicates a voltage signal controlling the main switch 12. Reference numeral 26 indicates a voltage signal controlling the auxiliary switch 26. $V_{S1}$ is a voltage across the first switch 12. $V_P$ is a voltage across the primary winding of the transformer T. $V_{SEC}$ is a voltage across the secondary winding of the transformer T. $I_M$ is a current flowing through the magnetizing inductor 14 of the transformer T. As shown in FIG. 8, signals 12 and 26 are complementary signals for controlling the main switch 12 and the auxiliary switch 26 respectively. That is, when the main switch 12 is turned on, the auxiliary switch 26 is turned off; and when the main switch 12 is turned off, the auxiliary switch 26 is turned on. The sum of the voltage $V_{S1}$ across the main switch 12 and the voltage $V_P$ across the primary winding of the transformer T is equal to the input voltage $V_{IN}$ of the transformer, that is, $V_{IN}=V_P+V_{S1}$. To satisfy the volt-second balance, the area encompassed by the voltage $V_P$ and the time axis when the main switch 12 is turned on is equal to the area encompassed by the voltage $V_P$ and the time axis when the main switch 12 is turned off. Assuming the duty cycle of the main switch 12 is D and the voltage across the main switch 12 when it is turned on is $V_{IN}$ then, when the main switch 12 is turned off, $V_P$ equals to $-V_{IN}$ [D/(1-D)] and $V_{S1}$ equals to $V_{IN}/(1-D)$. If D is 0.5, $V_{S1}$ equals to $2V_{IN}$. If D is 0.6, $V_{S1}$ equals to $2.5V_{IN}$. If the voltage resistivity of the main switch 12 can be made higher, the duty cycle D can be further extended.

As shown in FIG. 8, a negative $I_M$ indicates current flowing in a direction opposite to an arrow shown in FIG. 7. When the main switch 12 is turned on, the current $I_M$ discharges in an opposite direction to the arrow shown in FIG. 7 from the magnetizing inductor 14 to the input voltage $V_{IN}$ until no energy is stored in the magnetizing inductor 14. Then, the current $I_M$ flows in a direction along the arrow shown in FIG. 7 from the input voltage $V_{IN}$ so as to charge the magnetizing inductor 14 until the main switch 12 is turned off. After the main switch 12 is turned off, the current $I_M$ flows in a direction along the arrow shown in FIG. 7 via the auxiliary winding of the transformer and the first capacitor 22 so as to discharge to the second capacitor 28 until no energy is stored in the magnetizing inductor 14. Then, the current $I_M$ flows in an opposite direction to the arrow shown in FIG. 7 from the second capacitor 12 so as to charge the first capacitor 22 and the magnetizing inductor 14 via the same loop until the main switch 12 is turned on again. As can be seen from above-mentioned descriptions, the flow of the current $I_M$ is looped around the energy storing capacitor and inductor, so the magnetizing energy is not dissipated.

As shown in FIG. 8, $V_{SEC}$ is an AC voltage induced across the secondary winding by the primary winding of the transformer. $V_{SEC}$ is a square pulse that can be used to control the on/off operations of the first switch 32 and the second switch 34 so as to achieve synchronous rectification. When $V_{SEC}$ represents a positive voltage, the first switch 32 has to be turned on and the second switch 34 has to be turned off. When $V_{SEC}$ represents a negative voltage, the first switch 32 has to be turned off and the second switch 34 has to be turned on. The positive voltage end of the secondary winding of the transformer is connected to the control terminal of the first switch 32 to allow the first switch 32 to turn on when $V_{SEC}$ represents a positive voltage and turn off when $V_{SEC}$ represents a negative voltage. The negative voltage end of the secondary winding of the transformer is connected to the control terminal of the second switch 34 to allow the second switch 34 to turn off when $V_{SEC}$ represents a positive voltage and turn off when $V_{SEC}$ outputs a negative voltage. In this way, the first switch 32 and the second switch 34 naturally forms a complementary switch pair and thereby achieve synchronous rectification.

Though the preferred embodiment is illustrated in a manner by connecting the reset circuitry 20 to the auxiliary winding of the transformer T, the reset circuitry 20 can be alternatively connected to the primary winding or the secondary winding of the transformer T to reset the inner magnetic field of the transformer.

In contrast to the prior art, the present invention uses two capacitors, a diode serving as rectifier, and a switch to form a reset circuit. The reset circuit is connected to any one of the windings of a transformer to reset the magnetic field of the transformer and hold the magnetizing energy, thereby enhance the overall efficiency of the circuit. Also the demagnetizing voltage of the transformer can be stabilized, and the first switch can be implemented by a switch element having a lower voltage resistivity characteristic, and the duty cycle can be further extended. Because of the action of the reset circuitry, the secondary winding of the transformer outputs a square pulse, and the synchronization rectification switches of the output circuit are directly driven by the square wave to simplify the drive circuit and enhance the overall efficiency. In addition, the reset circuitry of the present invention is capable of providing a constant auxiliary voltage for the switch control circuit.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A reset circuitry for resetting an internal magnetic field of a transformer in a power converter when a main switch of the power converter is turned off, the reset circuit comprising:

a first capacitor connected in series with a winding of the transformer;

a rectifier connected in parallel with a series circuit comprising the first capacitor and the winding of the transformer;

a second capacitor;

an auxiliary switch connected in series with the second capacitor to form a series circuit to be connected in parallel with the rectifier; and a switch control circuit configured to turn on the main switch and turn off the auxiliary switch instantaneously so as to discharge magnetizing energy of a magnetizing inductor of the transformer and store the magnetizing energy in the magnetizing inductor and charge the first capacitor, and turn on the auxiliary switch and turn off the main switch after a short period of time so as to transmit the magnetizing energy and the energy stored in the first capacitor to a second capacitor, and charge the magnetizing inductor and the first capacitor through the second capacitor after the magnetizing energy of the magnetizing inductor is fully discharged.

2. The reset circuitry of claim 1 wherein the rectifier is a diode.

3. The reset circuitry of claim 1 wherein the switch control circuit is configured to prevent the main switch and the auxiliary switch from turning on simultaneously.

4. The reset circuitry of claim 1 wherein the transformer comprises at least a primary winding and a secondary winding, and the main switch is connected in series with the primary winding.

5. The reset circuitry of claim 4 wherein the transformer further comprises an auxiliary winding, and the reset circuit is connected in parallel with either the primary winding, the secondary winding, or the auxiliary winding of the transformer.

6. The reset circuitry of claim 1 wherein the reset circuitry is configured to provide a constant auxiliary power for the switch control circuit.

7. A reset circuitry for resetting an internal magnetizing field of a transformer of a power converter when a main switch of the power converter is turned off, the reset circuit comprising:

a first capacitor connected in series with a winding of the transformer;

a rectifier connected in parallel with a series circuit comprising the first capacitor and the winding of the transformer;

a second capacitor;

an auxiliary switch connected in series with the second capacitor to form a series circuit to be connected in parallel with the rectifier; and a switch control circuit configured to control the main switch and the auxiliary switch to prevent the main switch and the auxiliary switch from turning on simultaneously;

wherein the switch control circuit is configured to turn on the main switch and turn off the auxiliary switch instantaneously so as to store magnetizing energy in a magnetizing inductor, and turn on the auxiliary switch and turning off the main switch after a short period of time so as to transmit the magnetizing energy in the magnetizing inductor to the second capacitor, and charge the magnetizing inductor and the first capacitor by the second capacitor after the magnetizing energy of the magnetizing inductor is fully discharged.

8. The reset circuitry of claim 7 wherein the rectifier is a diode.

9. The reset circuitry of claim 7 wherein the transformer comprises at least a primary winding and a secondary winding, and the main switch is connected in series with the primary winding.

10. The reset circuitry of claim 9 wherein the transformer further comprises an auxiliary winding, and the reset circuit is connected in parallel with either the primary winding, the secondary winding, or the auxiliary winding of the transformer.

11. The reset circuitry of claim 7 wherein before the magnetizing energy is stored in the magnetizing inductor, the magnetizing energy that is stored in the magnetizing inductor originally is discharged in advance.

12. The reset circuitry of claim 7 wherein the first capacitor is charged to store energy when the magnetizing energy is stored in the magnetizing inductor, and the energy stored in the first capacitor is discharged to the second capacitor when the magnetizing energy stored in the magnetizing inductor is transmitted to the second capacitor.

13. The reset circuitry of claim 7 wherein the reset circuitry is configured to provide a constant auxiliary power for the switch control circuit.

14. A power converter comprising:

a main switch;

a transformer having at least a primary winding and a secondary winding, the primary winding is connected in series with the main switch for receiving an input DC voltage and inducing an AC voltage on the secondary winding according to an on/off state of the main switch;

a switch control circuit; and a reset circuitry for resetting an internal magnetizing field of the transformer;

wherein the transformer comprises a magnetizing inductor, and the switch control circuit is configured to output a pulse signal to turn on the main switch and turn off the reset circuitry instantaneously so as to store magnetizing energy in a magnetizing inductor of the transformer, and output another pulse signal to turn on the reset circuitry and turn off the main switch instantaneously so as to transmit magnetizing energy stored in the magnetizing inductor to the reset circuitry.

15. The power converter of claim 14 wherein the reset circuitry further comprises:

a first capacitor connected in series with a winding of the transformer;

a rectifier connected in parallel with a series circuit comprising the first capacitor and the winding of the transformer;

a second capacitor; and an auxiliary switch connected in series with the second capacitor to form a series circuit to be connected in parallel with the rectifier.

16. The power converter of claim 15 wherein the switch control circuit is set to prevent the main switch and the auxiliary switch from turning on simultaneously.

17. The power converter of claim 14 wherein the transformer further comprises an auxiliary winding, and the reset circuitry is connected in parallel with either the primary winding, the secondary winding, or the auxiliary winding of the transformer.

18. The power converter of claim 14 further comprising an output circuit connected to the secondary winding of the transformer, and the output circuit comprises a first switch, a second switch, and an output filter for providing an output DC voltage.

19. The power converter of claim 18 wherein the output filter comprises an inductor and a capacitor.

20. The power converter of claim 18 wherein the AC voltage induced on the secondary winding of the transformer is a square pulse for controlling an on/off state of the first switch and the second switches so as to rectify the AC voltage synchronously.

* * * * *